April 11, 1950     C. W. KNIGHT     2,503,342
BINOCULAR VIEWER

Filed Nov. 8, 1946     2 Sheets-Sheet 1

Inventor
CARL W. KNIGHT

By McMorrow, Berman & Davidson
Attorneys

April 11, 1950 — C. W. KNIGHT — 2,503,342
BINOCULAR VIEWER
Filed Nov. 8, 1946 — 2 Sheets-Sheet 2

Inventor
CARL W. KNIGHT
By McMorrow, Berman & Davidson
Attorneys

Patented Apr. 11, 1950

2,503,342

UNITED STATES PATENT OFFICE 2,503,342

BINOCULAR VIEWER

Carl W. Knight, Tampa, Fla.

Application November 8, 1946, Serial No. 708,657

2 Claims. (Cl. 88—29)

This invention relates to a new and improved binocular viewer, and has for its primary object the provision of such a device which produces a third dimensional effect and magnification of the viewed objects, such as photographic positives and negatives, and the like.

Another object is the provision of such a device which will provide such an effect while viewing a single photographic print taken by an ordinary camera.

A further object is the provision of such a device as that described which is of simple design and inexpensive to manufacture, and a device which is easily operated and understood.

Still further improvements and advantages of this invention will readily appear to those skilled in the art upon examination of the following description when read in the light of the accompanying drawings in which.

Figure 1:
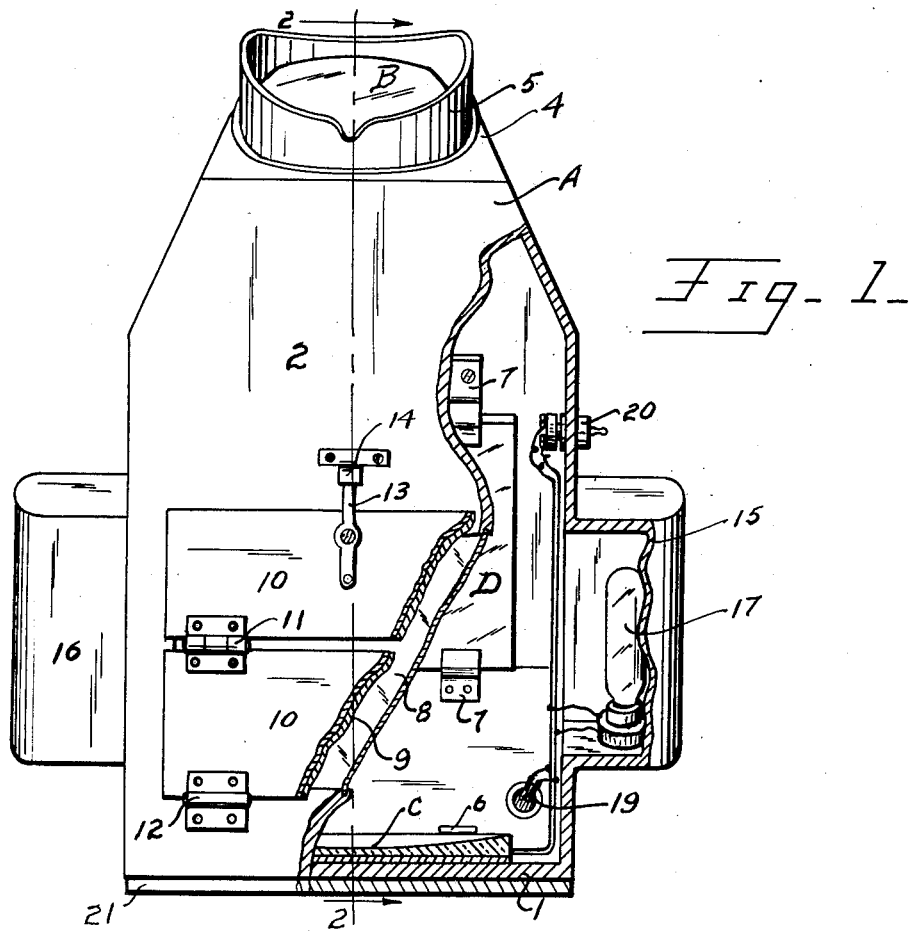
Fig. 1 is a rear elevation of the instrument partially broken away to show interior structure.
Figure 2:
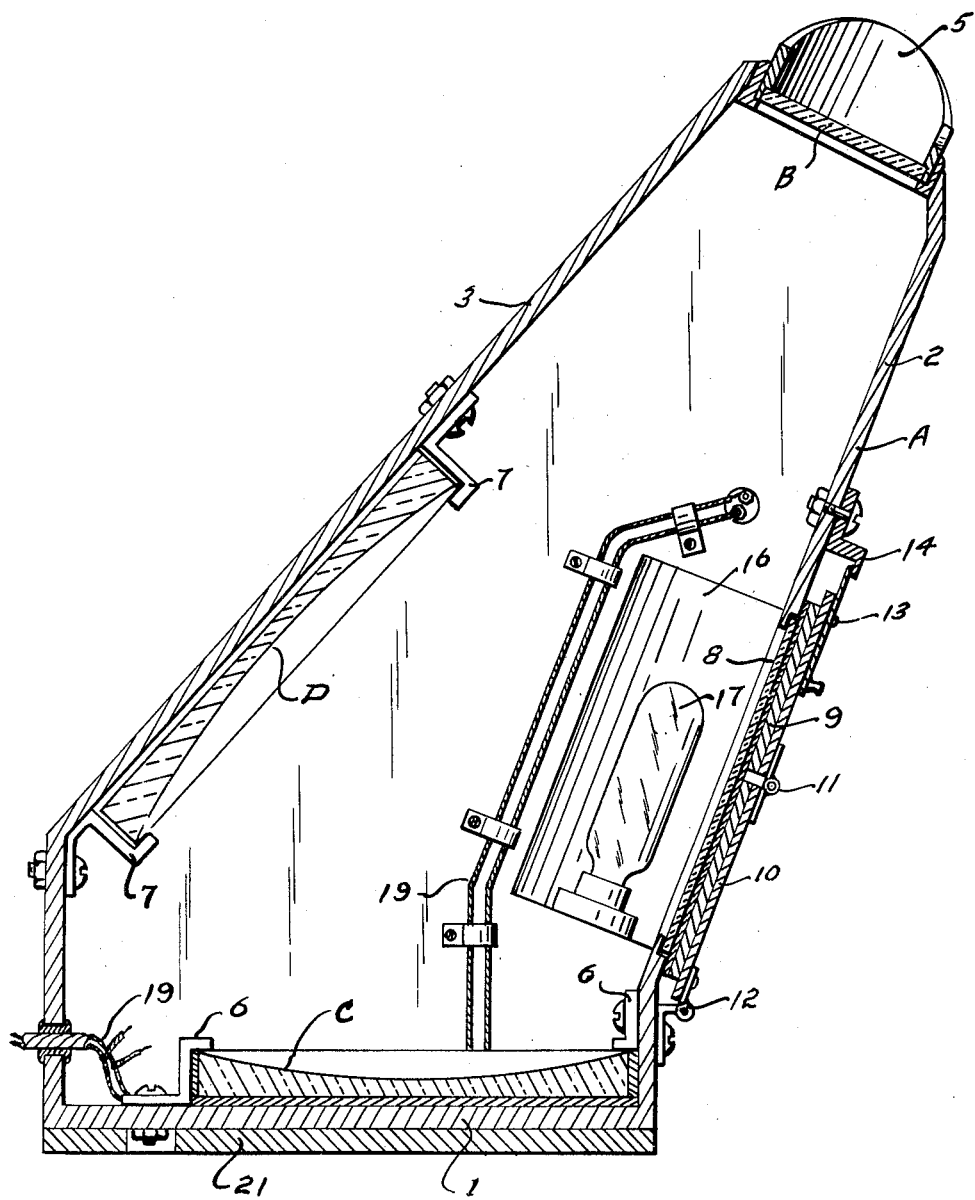
Figure 2 is a vertical section, on a somewhat enlarged scale, taken on the line 2—2 of Figure 1.

Referring now to the drawings in which like numerals indicate similar parts throughout the drawings A designates a rearwardly angulated frusto-pyramidical housing comprising a base 1, from which rise the back and front walls 2 and 3, respectively, whose upper portions converge to the opposite ends of a plain glass window B supported thereon, and surrounded by an eye shade 5.

Secured to the base 1 of the housing by holding down clamps 6 is a magnifying mirror C which lies in a centered position below the viewing window B.

Secured by holding clamps 7 to the front wall 3 is a second magnifying mirror D positioned at an acute angle with respect to mirror C, in such position that the image impinged thereon from the illuminated picture on the back of the housing A is magnified and reflected to the mirror C, which in turn magnifies the image and reflects it to the viewing window B.

Positioned on housing back wall 2 is a picture or print holder comprising a clear glass plate 8, inset into the wall, and a black backing material plate 9 carried on the halves of a divided backing board 10 which is horizontally hinged at its center as at 11. This backing board is clamped to the housing back wall 2 by a hinged clamp 12 at its bottom and a pivoted lock member 13 at its top, which engages a detent 14 on the back wall 2.

On either side of the picture holder are laterally outset cubicles 15 and 16 on the side walls of the housing A, containing light bulbs 17 and 18, for illuminating a picture or print in the holder behind the clear glass 8.

Suitable wiring 19 and a snap switch 20 are provided to control the illuminating lights.

A soft pad 21 is provided on the under side of base 1 to protect table surfaces and the like.

The above described viewer provides in use a magnified binocular view of ordinary photographs and other pictures. This effect is made possible by the use of the two mirrors C and D. Mirror D magnifies, reverses and reflects the image of a picture in the holder, into mirror C which in turn magnifies and rectifies the image and reflects it to the viewing window B.

Having thus fully described my invention what I claim as new and desire to secure by Letters Patent is:

1. A viewer comprising a vertically elongated housing terminating at its upper end in a viewing window, said housing comprising a substantially horizontal base and rearwardly angulated front and rear walls, said rear wall being formed above said base with a picture exposing opening, a picture holder mounted on said rear wall and registered with said opening, illuminating means on said housing at opposite sides of said opening for illumining a picture in said holder exposed in said opening, a first magnifying mirror on said rear housing wall facing said exposing opening to receive and magnify an image of an illumined picture exposed in said opening, and a second mirror on said base beneath said exposing opening arranged to receive and magnify a magnified image reflected from said first mirror and to reflect the magnified image to said viewing window, said first and second mirrors each consisting of a concave mirror, said mirrors being arranged so that the inverted image reflected from the first mirror is erected by said second mirror, said picture holder comprising a clear glass secured in said exposing opening, a frame hinged at its lower edge to the back of said housing back wall below the lower edge of said exposing opening, said frame comprising a backing member for engaging the back of a picture inserted in said opening against the back of said clear glass, pressure plate means for engaging the back of said backing member and pressing the picture against said clear glass, and catch means on said housing back wall above said opening engageable with a portion of said frame for releasably securing said frame in operative position, said pressure plate means comprising hingedly connected pressure plates.

2. A viewer comprising a vertically elongated housing terminating at its upper end in a viewing window, said housing comprising a substantially horizontal base and rearwardly angulated front and rear walls, said rear wall being formed above said base with a picture exposing opening, a picture holder mounted on said rear wall and registered with said opening, illuminating means on said housing at opposite sides of said opening for illumining a picture in said holder exposed in said opening, a first magnifying mirror on said rear housing wall facing said exposing opening to receive and magnify an image of an illumined picture exposed in said opening, and a second mirror on said base beneath said exposing opening arranged to receive and magnify a magnified image reflected from said first mirror and to reflect the magnified image to said viewing window, said first and second mirrors each consisting of a concave mirror, said mirrors being arranged so that the inverted image reflected from the first mirror is erected by said second mirror, said picture holder comprising a clear glass secured in said exposing opening, a frame hinged at its lower edge to the back of said housing back wall below the lower edge of said exposing opening, said frame comprising a backing member for engaging the back of a picture inserted in said opening against the back of said clear glass, pressure plate means for engaging the back of said backing member and pressing the picture against said clear glass, and catch means on said housing back wall above said opening engageable with a portion of said frame for releasably securing said frame in operative position, said backing member and said pressure plate means being opaque.

CARL W. KNIGHT.

REFERENCES CITED

The following references are of record in the file of this patent:

UNITED STATES PATENTS

| Number | Name | Date |
|---|---|---|
| 607,171 | Hill | July 12, 1898 |
| 1,044,107 | Vinnemeier | Nov. 12, 1912 |
| 1,053,650 | Saalburg | Feb. 18, 1913 |
| 1,110,318 | Field et al. | Sept. 15, 1914 |
| 1,114,605 | Good | Oct. 20, 1914 |
| 2,088,041 | Smith | July 27, 1937 |
| 2,211,218 | Serrurier | Aug. 13, 1940 |
| 2,211,376 | Isbell | Aug. 13, 1940 |
| 2,297,322 | Rasco | Sept. 29, 1942 |
| 2,317,282 | Lopez-Henriquez | Apr. 20, 1943 |
| 2,337,139 | Veatch | Dec. 21, 1943 |
| 2,363,427 | Langberg | Nov. 21, 1944 |
| 2,426,888 | Langberg | Sept. 2, 1947 |

FOREIGN PATENTS

| Number | Country | Date |
|---|---|---|
| 210,472 | Great Britain | Feb. 5, 1924 |